United States Patent [19]

Seefried, Jr. et al.

[11] 4,214,055
[45] Jul. 22, 1980

[54] HIGH RESILIENCE FLAME-RETARDANT POLYURETHANE FOAMS BASED ON POLYMER/POLYOL COMPOSITIONS

[75] Inventors: Carl G. Seefried, Jr.; George H. Armstrong; Russell Van Cleve, all of Charleston, W. Va.

[73] Assignee: Union Carbide Corporation, New York, N.Y.

[21] Appl. No.: 961,717

[22] Filed: Nov. 17, 1978

[51] Int. Cl.$^2$ .................. C08G 18/14; C08G 18/63; C08K 5/06; C09K 3/00
[52] U.S. Cl. .................. 521/137; 260/33.4 R; 521/904; 521/914; 521/129; 252/182
[58] Field of Search .................. 521/904, 137, 914; 260/33.4 R

[56] References Cited

U.S. PATENT DOCUMENTS

| | | | |
|---|---|---|---|
| 3,304,273 | 2/1967 | Stamberger | 521/904 |
| 3,383,351 | 5/1968 | Stamberger | 260/33.4 UR |
| 3,655,553 | 4/1972 | DeWald | 252/1 |
| 3,875,258 | 4/1975 | Patton et al. | 260/869 |
| 3,953,393 | 4/1976 | Ramlow et al. | 260/31.8 R |
| 4,119,582 | 10/1978 | Matsubara et al. | 521/904 |
| 4,148,840 | 4/1979 | Shah | 260/33.4 UR |

FOREIGN PATENT DOCUMENTS 828524 8/1975 Belgium .
828525 8/1975 Belgium .
735010 5/1966 Canada .
1412797 11/1975 United Kingdom .

OTHER PUBLICATIONS

Derwent Abstract, FARB *A25 27175A/15*.

Primary Examiner—H. S. Cockeram
Attorney, Agent, or Firm—Richard J. Gallagher

[57] ABSTRACT

Novel high resilience (HR) urethane foams are prepared from tolylene diisocyanate and novel polymer/polyol compositions made with acrylonitrile and vinylidene chloride monomers. The acrylonitrile:vinylidene chloride-polymer/polyol compositions enhance the load-bearing properties and decrease the flammability of HR foams made with them.

4 Claims, No Drawings

HIGH RESILIENCE FLAME-RETARDANT POLYURETHANE FOAMS BASED ON POLYMER/POLYOL COMPOSITIONS

CROSS-REFERENCE TO RELATED APPLICATION

U.S. patent application Ser. No. 961,715, filed on even date herewith, entitled POLYMER/POLYOL COMPOSITIONS CONTAINING VINYLIDENE CHLORIDE, in the names of Naresh Ramanlal Shah et al.

BACKGROUND OF THE INVENTION

1. Field of the Invention

In the molded urethane foam marketplace today, there exist two primary production processes—one based on conventional "hot-cure" technology and one based on high resilience (HR) technology. This invention relates to HR foams containing vinylidene chloride polymer, and to the novel polymer/polyol compositions from which they can be produced.

2. Description of the Prior Art

Polymer/polyol compositions suitable for use in producing polyurethane elastomers, foams, and the like, are known materials. The basic patents in this field are the Stamberger patents U.S. Pat. No. 3,304,273 (U.S. Pat. No. Re. 29,118), and U.S. Pat. No. 3,383,351 (U.S. Pat. No. Re. 28,715). The polymer/polyol compositions can be produced by polymerizing one or more olefinically unsaturated monomers dissolved or dispersed in a polyol in the presence of a free radical catalyst. Polymer/polyol compositions have the valuable property of imparting higher load-bearing properties to polyurethane elastomers and foams produced therefrom than are provided by unmodified polyols.

Polymer/polyols containing vinylidene chloride have been disclosed previously. For example, Dewald (U.S. Pat. No. 3,655,553) describes the preparation of polymer/polyols containing vinylidene chloride (but no acrylonitrile) in a polyol or a polyol blend. He employed a low reaction temperature (65° C.) and a semi-batch process. Another example is the Patton et al. (U.S. Pat. No. 3,875,258) disclosure of polymer/polyols containing copolymers of bis($\beta$-chloroethyl) vinyl phosphonate and vinylidene chloride and also polymer/polyols containing copolymers of bis($\beta$-chloroethyl) vinyl phosphonate, styrene, and vinylidene chloride. They employ a high reaction temperature (125°–130° C.) and a semi-batch process. Both Dewald and Patton et al. teach that such polymer/polyols can be utilized in the preparation of polyurethanes having flame retardant properties.

A Ramlow et al. patent (U.S. Pat. No. 3,953,393) teaches the preparation of polymer/polyols containing vinylidene chloride only or copolymers of vinylidene chloride and vinyl acetate or ethyl acrylate or methyl methacrylate in polyols containing added unsaturation. It operates at a temperature below 100° C., in the presence of a free-radical catalyst and a chain transfer agent (such as dodecylmercaptan). It employs a batch process having a typical holding time of 4 to 6 hours. According to its teachings, high reaction temperatures (i.e. greater than 100° C.) do considerable damage to sensitive monomers such as acrylonitrile and vinylidene chloride as well as to the polyols, resulting in colored dispersions. Kuryla (Canadian Pat. No. 735,010) provides a generic teaching of the preparation of urethane foams from isocyanates and polymer/polyol compositions. Among the monomers which this patent discloses as being polymerizable with the polyols are acrylonitrile and vinylidene chloride. In its Examples 17 and 18, the patent specifically discloses polymer/polyol compositions made from acrylonitrile, vinylidene chloride, and a trifunctional polyol made by the addition of 1,2-propylene oxide to glycerol to an average molecular weight of about 3000, and an average hydroxyl number of 56. In its Examples 64 and 65, this patent teaches the preparation of urethane foams from such polymer/polyol compositions and tolylene diisocyanate. The patent generically teaches that flexible urethane foams can be made from polyols having a hydroxyl number of from about 40 to about 70 or more. Neither Ramlow et al. nor Kuryla contains a teaching that fire retardant polyurethanes products can be made from the polymer/polyol compositions which they disclose.

The HR process referred to above continues to gain a dominant proportion of the molded foam market because, compared to the hot mold process, it produces a higher quality product at a lower energy demand. Much of the HR molded foam produced domestically has been based upon an 80:20 blend of TDI and PAPI. (TDI is an 80:20 blend of 2,4-tolylenediisocyanate and 2,6-tolylenediisocyanate; PAPI is a polymeric isocyanate.) HR molded foams produced with this isocyanate blend do not require a flame additive to meet the specifications of Federal Motor Vehicle Safety Standard (FMVSS) No. 302. Current commercial molded high resilience (HR) foams are based, in many cases, upon the isocyanate blend (of tolylene diisocyanates and a polymeric isocyanate) and a polymer/polyol composition derived from acrylonitrile and styrene. A continuous process for the production of acrylonitrile:styrene-polymer/polyol is described in Priest (British Patent Specification No. 1,412,797—Example 7). As far as is known, none of the above-mentioned vinylidene chloride-polymer/polyols have been used commercially in producing molded HR foams.

Substantial industry incentives exist to develop HR molded foam technology based upon a single isocyanate e.g. TDI. The conversion of molders currently employing "hot-cure" technology to HR foam technology based upon TDI is attractive because (1) additional isocyanate tankage is not required, (2) less energy is needed for the process, and (3) existing molds can be converted readily to the HR foam process. However, current molded foams based upon TDI require small concentrations of additive flame retardants to meet FMVSS No. 302 specifications. Generally, flame retardant additives are not stable in resin premixes and must be metered in a separate stream to the foam machine mixing head. Elimination of the special equipment and handling procedures for the additive flame retardant would simplify the use of TDI-based HR molded foam technology in a production operation.

SUMMARY OF THE INVENTION

In accordance with the present invention, it has been found that novel acrylonitrile:vinylidene chloride-polymer/polyol compositions derived from low hydroxyl number ethylene oxide-capped polyols can be utilized in conjunction with tolylene diisocyanate to make a fire retardant molded foam having unexpectedly good load-bearing characteristics. The polyols employed in the present invention have hydroxyl numbers of less than 38. The use of a polyol capped with ethylene oxide and having a low hydroxyl number in conjunction with acrylonitrile and vinylidene chloride as described herein permits the production of unique polymer/polyols which can be utilized to make urethane foams having properties unexpectedly better than those of foams derived from commercial polymer/polyols made from acrylonitrile:styrene polymer/polyols.

DESCRIPTION OF THE PREFERRED EMBODIMENTS

The novel polymer/polyol compositions utilized in the preparation of the foams of the present invention can be made by the in situ polymerization of a monomer mixture comprising a minor amount of acrylonitrile and a major amount of vinylidene chloride in an ethylene oxide-capped polyol having a hydroxyl number of less than about 38.

The organic polyols useful in this invention are known compounds. Functionally useful polyols should be liquid at room temperature and act as dispersing media for the polymers formed by the in situ polymerization of the monomer mixtures therein. The preferred polyols are relatively high molecular weight ethylene oxide-capped poly(oxypropylene) triols. It is most convenient to use polyols of the preferred type which have a hydroxyl number between about 25 and about 30.

The mixture of olefinic monomers which is polymerized in situ in the organic polyol medium has two components. The major portion, e.g. 65 to 75 percent by weight, is vinylidene chloride; the remainder is acrylonitrile. The amount by weight of monomer mixture utilized, relative to the polyol, should be sufficient to provide the desired foam product characteristics. Too high a percentage monomer may be undesirable from both economic and product-performance considerations. Since the conversion of monomer mixture to interpolymer is generally less than 100%, the amount by weight of the monomer mixture to be utilized will be greater than the amount by weight of interpolymer obtained in the polymer. For example, it has been found that when 18% 30:70 acrylonitrile:vinylidene chloride monomer mixture is polymerized in a polyol, the resulting polymer/polyol contains 16.2 weight percent interpolymer.

The polymer/polyols of this invention are produced by polymerizing the mixture of olefinically unsaturated monomers in the organic polyol medium at less than 70° C., e.g. at 68° C. The reaction is carried out in the presence of a catalytically effective amount of a conventional free radical catalyst known to be suitable for the polymerization of olefinically unsaturated monomers; t-butyl peroxypivalate is very active as a catalyst for this purpose.

The polymer/polyol products of this invention are conveniently prepared in a pressurized autoclave which has been designed for vinyl chloride polymerizations.

If desired, the polymer/polyols of this invention can be diluted prior to their use in the production of polyurethanes by adding thereto additional organic polyol.

The high resilience polyurethane foams of this invention are produced by reacting: (a) a polymer/polyol composition of this invention, (b) an organic polyisocyanate, (c) a catalyst for the reaction of (a) and (b) to produce a polyurethane product, (d) a blowing agent, and (c) a foam stabilizer.

Although other organic polyisocyanates can be used to prepare high resilience polyurethane foams with the polymer/polyol compositions of this invention, toluene diisocyanate is preferred, e.g. a mixture of 80% 2,4-tolylene diisocyanate and 20% 2,6-tolylene diisocyanate.

The catalysts that are useful in producing polyurethanes in accordance with this invention include the tertiary amines, such as bis(2-dimethylaminoethyl)ether, triethylenediamine, and the like. The catalysts are employed in small but catalytically effective amounts.

Water is a convenient blowing agent in the production of the polyurethane foams of this invention. The foam stabilizers which can be used therein include the known non-hydrolyzable polysiloxane-polyoxyalkylene block copolymers.

The high resilience polyurethane foams of this invention can be molded and so ultimately utilized e.g. in arm rests, crash pads, mattresses, and automobile bumpers.

Specific examples are presented below, primarily in tabular form, in order to elucidate the present invention. Such examples are intended to be demonstrative; they should not be construed as limiting the scope of the invention. In what appears below, the following designations have the indicated meanings:

Polyol 34—A polyether polyol based on glycerine starter to which propylene oxide is added to a hydroxyl number of about 40, after which the polyol is stripped and then "capped" with 15 percent by weight ethylene oxide to a final hydroxyl number of 34.

Polymer/Polyol 28—A prior art polymer/polyol based on Polyol 34 and having 21 percent by weight of a polymer comprising equal parts by weight of acrylonitrile and styrene. It has a hydroxyl number of 28.

Catalyst A-1—A solution consisting of 70% bis(2-dimethylaminoethyl)ether and 30% dipropylene glycol.

Catalyst 33—A solution consisting of 33% triethylene diamine and 67% dipropylene glycol.

Silicone L—A silicone of the formula

wherein Me represents methyl.

Silicone Y—A mixture of Silicone L and a silicone of the formula

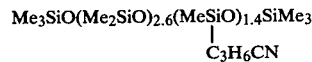

wherein Me represents methyl.

Isocyanate TDI—A mixture of 80% 2,4-tolylene diisocyanate and 20% 2,6-tolylene diisocyanate.
pbw—Parts by weight.
pcf—Pounds per cubic foot.
psi—Pounds per square inch.
pli—Pounds per linear inch.
ILD—Indentation Load Deflection, a measure of the firmness of the foam.
Comp. Set—Compression Set.

EXAMPLE A

Polymer/Polyol A, a polymer/polyol composition of this invention, was prepared utilizing as the monomer an acrylonitrile:vinylidene chloride mixture in the ratio of 30:70. The polyol utilized was a polypropylene oxide—polyethylene oxide triol made from propylene and ethylene oxides and glycerine and having a theoretical number average molecular weight of about 6000 and a hydroxyl number of about 27. The alkylene oxide units are present primarily in blocks and the end units are substantially all ethylene oxide units, i.e. the ethylene oxide is used to "cap" the triol. Based on its total weight, this triol contains about 14 weight percent ethylene oxide. Eighteen percent monomer was used, based upon total monomer and polyol. The polymer/polyol was prepared in a pressurized autoclave. The preparation was carried out at 68° C. with 1.6 percent t-butyl peroxypivalate added in two portions and a 17-hour reaction time. The conversion of the monomer mixture was 90 percent based upon the difference in hydroxyl number between the product and the starting polyol. The Brookfield viscosity of the polymer/polyol was only 3660 centipoises, and it had excellent filterability and only 2 percent centrifugible solids. Both monomers are volatile, so the residual monomers can be removed by vacuum stripping. The product of this semi-batch process contained 16.2 percent acrylonitrile:vinylidene chloride copolymer. It was brown in color.

EXAMPLES 1–10

Molded high resilience foams were prepared utilizing varying amounts of Polymer/Polyol A. Molds (15"×15"×4.75") were prepared by waxing them with a mold release agent, heating them to about 80° or 90° C., wiping off excess mold release agent, and allowing the molds to cool to about 50° C. Tolylene diisocyanate was weighed into a beaker and water and bis(2-dimethylaminoethyl)ether, triethylene diamine, and diethanolamine catalysts were measured into another beaker. The polyol and polymer/polyol (equal portions) and dibutyl tindilaurate catalyst and silicone surfactant were weighed into a half-gallon carton and placed on a drill press. With the timer set for a total of 90 seconds, the polyol and polymer/polyol was mixed for 30 seconds with a 2.5 inch 6-blade turbine at 4000 rpm. The mixer was stopped, the carton was removed, and the water/amine mixture and baffles were added to the carton. Mixing was resumed for 55 seconds and stopped. The isocyanate was added and mixing was continued for five seconds. (This is the end of the 90-second preset time.) The product was allowed to drain from the mixer for a few seconds, the carton was removed and shaken several times into a mold, which was at about 50° C., and the mold lid was closed. After two minutes, the mold was placed in an oven at about 120° C. for six minutes (total—eight minutes). The foam was demolded and crushed by hand, and then run through rollers three times. The foam was trimmed and weighed. Exit time, foam weight, tightness, green strength and moldability were recorded, and the foam was placed immediately in a test laboratory at 50 percent relative humidity to cure before testing. The results are depicted in Table I.

As is readily apparent from a comparison of the 25ILD and 65% ILD values obtained in Examples 3–10, which relate to foams of this invention, with the corresponding values obtained in Examples 1 and 2, which relate to foams made with a conventional polymer/polyol, the polymer/polyols of this invention produce a significantly greater enhancement of the firmness or load-bearing properties of the foams than does the conventional polymer/polyol. This is particularly surprising because Polymer/Polyol 28 contains 21% polymer while Polymer/Polyol A contains only 16% polymer. It is known that generally, to a first approximation, the foam load-bearing enhancement of a polymer/polyol is proportional to its polymer content.

TABLE I

HR MOLDED FOAM FORMULATIONS AND PHYSICAL PROPERTIES FOR AN ACRYLONITRILE:VINYLIDENE CHLORIDE (30:70)-POLYMER/POLYOL

| Example | 1 | 2 | 3 | 4 | 5 | 6 | 7 | 8 | 9 | 10 |
|---|---|---|---|---|---|---|---|---|---|---|
| Formulation, pbw | | | | | | | | | | |
| Polyol 34 | 50 | 50 | 50 | 50 | 50 | 50 | 50 | 50 | 50 | 50 |
| Polymer/Polyol 28 | 50 | 50 | 49 | 47 | 45 | 43 | 40 | 30 | 20 | — |
| Polymer/Polyol A | — | — | 1 | 3 | 5 | 7 | 10 | 20 | 30 | 50 |
| Diethanolamine | 0.8 | | | | | | | | | |
| Water | 2.6 | | | | | | | | | |
| Catalyst A-1 | 0.10 | | | | | | | | | |
| Catalyst 33 | 0.50 | →  | | | | | | | | |
| Dibutyltindilaurate | 0.05 | | | | | | | | | |
| Silicone L | 1.5 | | | | | | | | | |
| Isocyanate TDI, Index | 105 | | | | | | | | | |
| Mold Exit Time, secs. | 33 | 31 | 33 | 32 | 33 | 32 | 35 | 39 | 42 | 45 |
| Physical Properties | | | | | | | | | | |
| Density, Overall, pcs | 3.06 | 3.01 | 3.11 | 3.13 | 3.10 | 3.09 | 3.11 | 3.10 | 3.09 | 3.09 |
| Core, pcf | 2.80 | 2.67 | 2.73 | 2.70 | 2.73 | 2.72 | 2.88 | 2.85 | 2.83 | 2.82 |
| Air Porosity, ft$^3$/min/ft$^2$ | 20.8 | 10.8 | 12.3 | 9.3 | 14.3 | 6.0 | 7.5 | 5.1 | 6.8 | 5.3 |
| Resiliency, % Ball Rebound | 61 | 57 | 61 | 58 | 55 | 50 | 50 | 45 | 47 | 48 |
| ILD (lbs/50 in$^2$) | | | | | | | | | | |
| 25% | 43.3 | 46.4 | 51.9 | 52.1 | 52.8 | 53.6 | 53.6 | 57.2 | 60.2 | 65.2 |
| 65% | 113.3 | 119.2 | 129.0 | 132.0 | 130.5 | 132.8 | 134.8 | 136.3 | 134.5 | 139.5 |
| 25% Return, % | 84.3 | 80.4 | 81.2 | 80.8 | 80.8 | 80.6 | 83.4 | 80.4 | 80.4 | 79.8 |
| Support Factor | 2.62 | 2.58 | 2.49 | 2.53 | 2.47 | 2.48 | 2.51 | 2.38 | 2.23 | 2.14 |
| Tensile Strength, psi | 31.5 | 30.3 | 33.6 | 31.4 | 30.6 | 26.8 | 29.3 | 27.7 | 26.1 | 22.2 |
| Elongation, % | 206 | 184 | 192 | 189 | 171 | 149 | 165 | 159 | 159 | 152 |
| Tear Resistance, pli | 2.47 | 2.57 | 2.53 | 2.29 | 2.51 | 2.51 | 2.24 | 2.49 | 2.46 | 2.48 |
| 75% Comp. Set, $C_d$, % | 14.5 | 15.3 | 11.1 | 11.0 | 11.4 | 10.3 | 11.8 | 11.3 | 11.9 | 13.5 |
| Humid Aging (5 hrs. at 120° C.) | | | | | | | | | | |
| 50% Comp. Set, $C_d$, % | 15.8 | 19.2 | 19.1 | 19.3 | 18.1 | 19.4 | 16.5 | 17.2 | 16.1 | 16.1 |
| 50% Load Loss, % | 13.7 | 26.4 | 26.0 | 26.1 | 27.2 | 28.2 | 16.8 | 15.7 | 14.8 | 15.1 |
| FMVSS No. 302 | | | | | | | | | | |
| Avg. Burn Rate, in./min. | 2.0 | 2.1 | 0 | 0 | 0 | 0 | 0 | 0 | 0 | 0 |
| Calif. Vertical Burn | | | | | | | | | | |
| Avg. Char Length, in. | 10.4 | 12 | 12 | 12 | 12 | 12 | 9.3 | 2.3 | 2.1 | 2.2 |
| Avg. Afterflame, secs. | 31.1 | 34.6 | 37.2 | 41.8 | 39.9 | 43.7 | 32.9 | 1.9 | 0.8 | 0 |

TABLE I-continued

| HR MOLDED FOAM FORMULATIONS AND PHYSICAL PROPERTIES FOR AN ACRYLONITRILE:VINYLIDENE CHLORIDE (30:70)-POLYMER/POLYOL | | | | | | | | | | |
|---|---|---|---|---|---|---|---|---|---|---|
| Example | 1 | 2 | 3 | 4 | 5 | 6 | 7 | 8 | 9 | 10 |
| Avg. Afterglow, secs. | 0 | 0 | 0 | 0 | 0 | 0 | 0 | 0 | 0 | 0 |

EXAMPLES 11-31

The HR foams described in the remaining Examples, which demonstrate various factors which affect the load-bearing properties of foams, were made by a bench molding procedure essentially the same as that described above. All foams were aged to a minimum of three days prior to testing in order to insure that ultimate physical properties were attained. Physical properties were measured according to ASTM Standard 2406.

Polymer/polyols are used to control the load bearing properties of HR molded foam. Data presented in Table II show that firmness responds in a typical manner, i.e. loads are increased linearly as the concentration of Polyol 28 is raised. The 65% ILD's are raised approximately 0.9 lbs/50 in$^2$ per each part by weight increase in polymer/polyol concentration. As expected, strength properties are enhanced with higher levels of polymer/polyol.

TABLE II

| High Resilience Molded Polyurethane Foam Effect of Polymer/Polyols on Physical Properties | | | |
|---|---|---|---|
| Example | 11 | 12 | 13 |
| Formulation, pbw | | | |
| Polyol 28 | 20 | 40 | 60 |
| Polyol 34 | 80 | 60 | 40 |
| Water | 2.5 | | |
| Triethylenediamine | 0.1 | | |
| Catalyst A-1 | 0.1 | | |
| Dibutyltin dilaurate | 0.005 | ⎯⎯→ | |
| Tris(2-chloroethyl)phosphate | 1.5 | | |

TABLE II-continued

| High Resilience Molded Polyurethane Foam Effect of Polymer/Polyols on Physical Properties | | | |
|---|---|---|---|
| Example | 11 | 12 | 13 |
| Silicone Y | 1.5 | | |
| Diethanolamine | 0.8 | | |
| Isocyanate TDI | 33.1 | 32.7 | 32.4 |
| Physical Properties | | | |
| Overall/Core Density, pcf | 3.0/2.71 | 3.0/2.75 | 3.0/2.73 |
| Resiliency, % Ball Rebound | 68 | 68 | 67 |
| Air Porosity, ft$^3$/min/ft$^2$ | 32 | 30 | 28 |
| ILD (4-inch), lbs/50 in$^2$ | | | |
| 25% Deflection | 33.8 | 39.3 | 47.2 |
| 65% Deflection | 88.0 | 102.5 | 123.0 |
| 25% Return Value | 82.2 | 81.7 | 80.5 |
| Load Ratio | 2.60 | 2.61 | 2.61 |
| Tensile Strength, psi | 22.3 | 23.4 | 25.8 |
| Elongation, % | 168 | 158 | 144 |
| Tear Resistance, lbs/in | 1.47 | 1.59 | 1.83 |
| 75% Comp. Set, % | 7.0 | 7.1 | 6.7 |
| 5-Hour Humid Aging | | | |
| 50% Comp. Set, % | 15.2 | 16.1 | 16.3 |
| Load Loss, % | 28.8 | 27.9 | 26.0 |

The data presented in Table III indicate that over the range studied (0.2 to 0.4 pbw amine), load bearing properties of foams made with TDI are not significantly affected by increases in amine catalysts. Foam porosity and tear strength are enhanced as the ratio of Catalyst A-1 to triethylenediamine is raised. Thus, within an established processing range, there is a technical advantage to using as high an A-1/triethylenediamine ratio as possible.

TABLE III

| HIGH RESILIENCE MOLDED POLYURETHANE FOAM EFFECT OF AMINE CATALYSTS | | | | | | | |
|---|---|---|---|---|---|---|---|
| Example | 14 | 15 | 16 | 17 | 18 | 19 | 20 |
| Formulation, pbw | | | | | | | |
| Polyol 34 | 60 | | | | | | |
| Polyol 28 | 40 | | | | | | |
| Water | 2.5 | | | | | | |
| Dibutyltindilaurate | 0.005 | | | | | | |
| Silicone Y | 3.0 | ⎯⎯⎯⎯⎯⎯⎯⎯⎯⎯⎯⎯⎯⎯⎯⎯→ | | | | | |
| Diethanolamine | 0.8 | | | | | | |
| Tris(2-chloroethyl)phosphate | 1.5 | | | | | | |
| Triethylenediamine | 0.1 | 0.2 | .15 | 0.1 | .3 | .2 | .1 |
| Catalyst A-1 | 0.1 | 0.1 | .15 | 0.2 | .1 | .2 | .3 |
| Isocyanate TDI | 32.7 | ⎯⎯⎯⎯⎯⎯⎯⎯⎯⎯⎯⎯⎯⎯⎯⎯→ | | | | | |
| Physical Properites | | | | | | | |
| Overall/Core Density, pcf | 3.0/2.75 | 3.0/2.54 | 3.0/2.64 | 3.0/2.67 | 3.0/2.60 | 3.0/2.65 | 3.0/2.67 |
| Resiliency, % Ball Rebound | 61 | 61 | 64 | 64 | 58 | 66 | 64 |
| Air Porosity, ft$^3$/min/ft$^2$ | 16 | 13 | 18.5 | 22 | 8 | 13 | 21.4 |
| ILD (4-inch) lbs/50 in$^2$ | | | | | | | |
| 25% Deflection | 39.3 | 38.7 | 40.0 | 38.8 | 40.1 | 38.8 | 38.2 |
| 65% Deflection | 102.5 | 98.1 | 103.0 | 97.5 | 102.5 | 98.3 | 96.7 |
| 25% Return Value | 82.6 | 82.0 | 82.2 | 81.8 | 80.7 | 81.9 | |
| Load Ratio | — | 2.54 | 2.57 | 2.51 | 2.56 | 2.53 | 2.53 |
| Tensile Strength, % | — | 22.6 | 24.7 | 24.6 | 24.9 | 21.8 | 24.4 |
| Elongation, % | — | 145 | 153 | 159 | 148 | 144 | 159 |
| Tear Resistance, lbs/in | — | 1.60 | 1.79 | 1.91 | 1.70 | 1.73 | 2.03 |
| 75% Comp. Set, % | — | 7.4 | 7.7 | 7.6 | 8.0 | 7.8 | 7.8 |
| 5-Hr. Humid Aging | | | | | | | |
| 50% Comp. Set, % | — | 16.7 | 14.7 | 14.8 | 17.8 | 14.8 | 15.7 |
| Load Loss, % | — | 25.1 | 27.1 | 27.3 | 24.3 | 23.9 | 24.1 |

Water is added to a flexible foam formulation as a means to enhance modulus through the formation and secondary hydrogen bonding of urea groups. The addition of water also generates carbon dioxide which is useful as a blowing agent to lower foam densities. Results in Table IV show that under minimum fill conditions, ILD's are lowered as the concentration of water is raised in the formulation. An increase in water from 2.0 to 3.0 pbw lowered foam densities from 3.32 to 2.52 pounds per cubic feet with a corresponding decrease in load bearing properties (minimum fill foams). The data also show that when densities are maintained constant via "packing" techniques, an increase in the concentration of water raises loads dramatically (Examples 24 and 25). Many grades of foam varying in density and firmness can be produced via a combination of "packing" and a variation of water in the formulation.

TABLE IV

HIGH RESILIENCE MOLDED POLYURETHANE FOAM
EFFECT OF WATER ON PHYSICAL PROPERTIES

|  | Minimum Fill | | | Packed to Constant Density | |
|---|---|---|---|---|---|
| Example | 21 | 22 | 23 | 24 | 25 |
| Formulation, pbw | | | | | |
| Polyol 34 | 60 | | | 60 | |
| Polyol 28 | 40 | | | 40 | |
| Catalyst A-1 | 0.1 | | | 0.1 | |
| Triethylenediamine | 0.1 | → | | 0.1 | → |
| Dibutyltindilaurate | 0.005 | | | 0.005 | |
| Tris(1-chloroethyl)phosphate | 1.5 | | | 1.5 | |
| Diethanolamine | 0.8 | | | 0.8 | |
| Silicone Y | 1.5 | 1.5 | 2.5 | 1.5 | |
| Flourotrichloromethane | — | — | — | 3.0 | 0 |
| Water | 2.0 | 2.5 | 3.0 | 2.0 | 3.0 |
| Isocyanate TDI | 27.6 | 32.7 | 37.8 | 27.6 | 37.8 |
| Physical Properties | | | | | |
| Overall/Core Density, pcf | 3.32/2.83 | 2.78/2.56 | 2.52/2.37 | 3.03/2.84 | 3.03/2.76 |
| Resiliency, % Ball Rebound | 68 | 63 | 54 | 70 | 66 |
| Air Porosity, $ft^3/min/ft^2$ | 45 | 36 | 13 | 39 | 27 |
| ILD (4-inch), $lbs/50\ in^2$ | | | | | |
| 25% Deflection | 33.0 | 27.9 | 21.3 | 30.0 | 53.0 |
| 65% Deflection | 93.3 | 79.4 | 60.5 | 81.3 | 132.3 |
| 25% Return Value, % | 84.8 | 81.4 | 76.1 | 83.3 | 79.4 |
| Load Ratio | 2.83 | 2.85 | 2.84 | 2.71 | 2.50 |
| Tensile Strength, psi | 19.9 | 19.1 | 19.1 | 17.7 | 24.1 |
| Elongation, % | 153 | 144 | 191 | 148 | 153 |
| Tear Resistance, lbs/in | 1.43 | 1.44 | 2.02 | 1.32 | 1.96 |
| 75% Comp. Set, % | 6.6 | 8.6 | 10.8 | 7.1 | 7.2 |
| 5-Hour Humid Aging | | | | | |
| 50% Comp. Set, % | 14.3 | 20.2 | 21.6 | 14.7 | 19.2 |
| Load Loss, % | 31.4 | 28.4 | 20.5 | 31.7 | 23.0 |

A crosslinker is required to stabilize HR foam based on Isocyanate TDI. Diethanolamine has been found to be very useful in this regard. Data presented in Table V show that adequate stability and a good quality foam were achieved at 1.0 and 2.0 pbw diethanolamine. Higher concentrations than that required to stabilize are contraindicated because of its adverse effect on foam strength properties. Load bearing properties were also lowered slightly (~5%) at the higher concentration of diethanolamine evaluated.

TABLE V

HIGH RESILIENCE MOLDED POLYURETHANE FOAM
EFFECT OF DIETHANOLAMINE CROSSLINKER

| Example | 26 | 27 |
|---|---|---|
| Formulation, pbw | | |
| Polyol 34 | 60 | |
| Polyol 28 | 40 | |
| Water | 3.0 | |
| Catalyst A-1 | 0.125 | → |
| Catalyst 33 | 0.4 | |
| Stannic Mercaptide Catalyst | 0.01 | |
| Silicone Y | 1.5 | |
| Diethanolamine | 1.0 | 2.0 |
| Isocyanate TDI | 38.3 | 40.8 |
| Physical Properties | | |
| Overall/Core Density, pcf | 2.79/2.51 | 2.79/2.45 |
| Resiliency, % Ball Rebound | 65 | 67 |
| Air Porosity, $ft^3/min/ft^2$ | 26.7 | 34.4 |
| ILD (4-inch), $lbs./50\ in^2$ | | |
| 25% Deflection | 43.5 | 40.1 |
| 65% Deflection | 111.5 | 105.0 |
| 25% Return Value | 80.0 | 82.6 |
| Load Ratio | 2.56 | 2.62 |
| Tensile Strength, psi | 27.0 | 24.7 |
| Elongation, % | 161 | 133 |
| Tear Resistance, lbs/in | 1.83 | 1.50 |
| 75% Comp. Set, % | 9.1 | 8.0 |
| 5-Hour Humid Aging | | |
| 50% Comp. Set, % | 17.6 | 25.2 |
| Load Loss, % | 18.6 | +1.0 |

The isocyanate index was varied to measure its effect on foam properties (see Table VI). The data show that at higher indices there is a corresponding increase in load bearing properties. It appears that an index of ~110 is near the upper limit of what could be reasonably processed. Substantial foam collapse was observed when the index was raised to 115. Tear resistance properties were particularly affected by changes in isocyanate index—an increase from 100 to 110 lowered tear resistance values from 1.75 to 1.38 lbs/in.

TABLE VI
HIGH RESILIENCE MOLDED POLYURETHANE FOAM
EFFECT OF ISOCYANATE INDEX ON PHYSICAL PROPERTIES

| Example | 28 | 29 | 30 | 31 |
|---|---|---|---|---|
| Formulation, pbw | | | | |
| Polyol 34 | 60 | | | |
| Polyol 28 | 40 | | | |
| Water | 2.5 | | | |
| Triethylenediamine | 0.1 | | | |
| Catalyst A-1 | 0.1 | →| | |
| Dibutyltindilaurate | 0.005 | | | |
| Tris(z-chloroethyl)phosphate | 1.5 | | | |
| Silicone Y | 1.5 | | | |
| Diethanolamine | 0.8 | | | |
| Isocyanate TDI | 31.2 | 32.7 | 34.3 | 35.6 |
| Index | 100 | 105 | 110 | 115 |
| Physical Properties | | | | |
| Overall/Core Density, pcf | 3.04/2.62 | 2.96/2.77 | 2.98/2.64 | |
| Resiliency, % Ball Rebound | 65 | 67 | 65 | |
| Air Porosity, $ft^3/min/ft^2$ | 19 | 21 | 33 | |
| ILD (4-inch), lbs/50 $in^2$ | | | | |
| 25% Deflection | 34.8 | 39.9 | 41.5 | |
| 65% Deflection | 89.1 | 105.3 | 110.5 | |
| 25% Return, Value | 80.5 | 81.2 | 81.7 | |
| Load Ratio | 2.56 | 2.64 | 2.66 | Foam |
| Tensile Strength, psi | 22.1 | 23.5 | 21.8 | Collapse |
| Elongation, % | 160 | 171 | 142 | |
| Tear Resistance, lbs/in | 1.75 | 1.65 | 1.38 | |
| 75% Comp. Set, % | 9.45 | 8.70 | 8.12 | |
| 5-Hour Humid Aging | | | | |
| 50% Comp. Set, % | 16.3 | 16.0 | 17.1 | |
| Load Loss, % | 26.1 | 28.1 | 30.4 | |

What is claimed is:

1. A high resilience flame-retardant urethane foam made from tolylene diisocyanate and a polymer/polyol composition, said polymer/polyol composition consisting essentially of a stable dispersion, in an ethylene oxide-capped polyol having a hydroxyl number of less than about 38, of an interpolymer of a monomer mixture composed of a minor amount of acrylonitrile and a major amount of vinylidene chloride.

2. A high resilience flame-retardant urethane foam as in claim 1 in which the polymer/polyol composition consists essentially of a stable dispersion, in an ethylene oxide-capped polyol having a hydroxyl number between 25 and 30, of an interpolymer of a monomer mixture composed of from 25 to 35 percent by weight acrylonitrile and from 75 to 65 percent by weight vinylidene chloride.

3. A polymer/polyol composition consisting essentially of a stable dispersion, in an ethylene oxide-capped polyol having a hydroxyl number of less than about 38, of an interpolymer of a monomer mixture composed of a minor amount of acrylonitrile and a major amount of vinylidene chloride, the amount by weight of monomer mixture required, relative to the polyol, sufficient to provide a high resilience, flame-retardant polyurethane foam.

4. A polymer/polyol composition as in claim 3 which consists essentially of a stable dispersion, in an ethylene oxide-capped polyol having a hydroxyl number between 25 and 30, of an interpolymer of a monomer mixture composed of from 25 to 35 percent by weight acrylonitrile and from 75 to 65 percent by weight vinylidene chloride, the amount by weight of monomer mixture required, relative to the polyol, sufficient to provide a high resilience, flame-retardant polyurethane foam.

* * * * *